United States Patent [19]
Labauze

[11] Patent Number: 6,071,995
[45] Date of Patent: Jun. 6, 2000

[54] RUBBER COMPOSITION BASED ON CARBON BLACK HAVING SILICA FIXED TO ITS SURFACE AND ON DIENE POLYMER FUNCTIONALIZED OR MODIFIED WITH SILANOL FUNCTIONS

[75] Inventor: Gérard Labauze, Clermont-Ferrand, France

[73] Assignee: Michelin & Cie, Cedex, France

[21] Appl. No.: 09/073,551

[22] Filed: May 6, 1998

[30] Foreign Application Priority Data

May 7, 1997 [FR] France .................................. 97 05887

[51] Int. Cl.$^7$ ....................................................... C08J 5/24
[52] U.S. Cl. ............................. 524/269; 528/10; 528/25; 524/261; 524/264; 524/265; 524/266; 524/267; 524/442; 524/495; 524/543
[58] Field of Search ........................ 528/10, 25; 524/261, 524/264, 265, 266, 267, 269, 442, 495, 543

[56] References Cited

FOREIGN PATENT DOCUMENTS 0299074  1/1989  European Pat. Off. .
0711805  5/1996  European Pat. Off. .

*Primary Examiner*—Samuel A. Acquah
*Attorney, Agent, or Firm*—Baker and Botts, LLP

[57] ABSTRACT

A rubber composition of improved hysteretic and physical properties which make it suitable for forming a tire tread, notably a tire tread of reduced rolling resistance, the rubber composition including carbon black having silica fixed to its surface as the majority portion of reinforcing filler and at least one functionalized diene polymer having at the end of its chain a silanol function or a polysiloxane block including a silanol end or a diene polymer modified along its chain by silanol functions.

12 Claims, No Drawings

RUBBER COMPOSITION BASED ON CARBON BLACK HAVING SILICA FIXED TO ITS SURFACE AND ON DIENE POLYMER FUNCTIONALIZED OR MODIFIED WITH SILANOL FUNCTIONS

BACKGROUND OF INVENTION

The present invention relates to a rubber composition for use particularly in the manufacture of tire treads, having improved hysteretic and physical properties in the vulcanized state, and comprising a diene polymer functionalized or modified by means of silanol functions and carbon black having silica fixed to its surface as reinforcing filler.

Since savings in fuel and the necessity of environmental protection have become a priority, it is desirable to produce polymers having good mechanical properties and the lowest possible hysteresis in order to be able to use them in the form of rubber compositions usable in the production of various semi-finished products which enter into the composition of tire treads, such as, e.g., underlayers, binding gums between rubbers of various types or sheathings of metallic or textile re-enforcements, sidewall rubbers or tire treads, and to obtain tires of improved properties, and particularly a reduced rolling resistance.

To attain this objective, numerous solutions have been proposed consisting, in particular, in modifying the nature of diene polymers and copolymers at the end of polymerization by means of coupling agents, starring agents or functionalizing agents. Essentially, the great majority of these solutions have concentrated on the use of polymers modified with carbon black as reinforcing filler, with a view of obtaining a good interaction between the modified polymer and carbon black, inasmuch as the use of a white filler, notably silica, has proved to be inappropriate owing to the low value of some properties of such compositions and hence of certain characteristics of tires using these compositions, such as low abrasion resistance. As illustrative prior-art examples, reference may be made to U.S. Pat. No. 4,677,165 which describes the reaction of living polymers functionalized with benzophenone derivatives to obtain improved properties of compositions containing carbon black. With the same objective, U.S. Pat. No. 4,647,625 describes the functionalization of polymers by reacting living polymers with N-methyl-pyrrolidine. Patent Applications EP-A 0,590,491 and EP-A 0,593,049 describe elastomers containing amine functions, which permit a better interaction between polymer and carbon black.

A few solutions have also been proposed concerning the use of silica as reinforcing filler in compositions intended for the production of tire treads. Thus, Patent Applications EP-A 0,299,074 and EP-A 0,447,066 describe functionalized polymers comprising alkoxysilane functions. These functionalized polymers have been described in the prior art as being effective in reducing hysteresis and improving the abrasion resistance; nevertheless, the properties of these polymers remain inadequate to permit their use in compositions intended for making tire treads.

Moreover, the formulation of these polymers poses problems due the development of macrostructures during elimination of the polymerization solvent, which leads to severe deterioration of properties of potential interest. Furthermore, this development cannot be well controlled.

Moreover, coupling reactions are frequently observed during such functionalization reactions, and, in order to minimize them, an excess of alkoxysilane and/or intense mixing are generally used.

This interest in silica-containing compositions has recently been demonstrated by the publication of Patent Application EP-A 0,501,227, which discloses a rubber composition vulcanizable with sulfur, obtained by thermomechanical working of a copolymer of diene copolymer and a vinylaromatic compound, and using a special precipitated silica obtained by the process described in EP-A 0,157,703. This composition, which represents an excellent compromise between several contradictory properties, permits the manufacture of tire treads having a tread filled with a special silica.

However, it is necessary, in silica-based compositions, to use relatively large amounts of linking agents to ensure that said compositions retain a good mechanical strength. These materials have very low electric conductivities, which, under certain special circumstances, do not always permit efficient grounding of accumulated static electricity, and which make it desirable to use a more complex method of tire production, using old solutions that are taken up, notably, in U.S. Pat. No. 5,518,055, EP-A 0,705,722 or EP-A 0,718,126 which describe the use of a conductive rubber strip traversing the tire tread; or in Patent Application EP-A 0,556,890, which deals with the addition of special conductive polymers to the rubber composition which constitutes the tire tread.

More recently, Patent Application WO 96/37547 has described a rubber composition using, as reinforcing filler, carbon black having silica fixed to its surface, and which is based on a functionalized or nonfunctionalized diene polymer and a silane coating agent and coupling agent. This composition seems to have hysteretic properties that are improved in comparison to compositions containing carbon black as reinforcing filler. However, the silane coating agent and coupling agent must always be used in relatively large quantities.

SUMMARY OF THE INVENTION

It has been discovered in a surprising manner that diene polymers having at their chain end a silanol function or a polysiloxane block comprising a silanol end, or diene polymers modified along their chain by silanol functions which do not develop macrostructure during their functionalization, confer on vulcanized compositions which contain carbon black with silica fixed to its surface as reinforcing filler, rubber properties and, in particular, hysteretic and physical properties that are improved in comparison to those of compositions based on non-functional or functional diene polymers adapted to carbon black, said improved properties being at the same level as those of compositions based on functionalized or non-functionalized diene polymers comprising a linking agent and silica as reinforcing filler, and, furthermore, show a distinct increase of electric conductivity in comparison to that of the latter compositions.

The present invention relates to a vulcanizable rubber composition comprising at least one functionalized or modified diene polymer, carbon black having silica fixed to its surface as reinforcing filler, and other conventional constituents of such compositions, characterized in that the diene polymer is a functionalized diene polymer comprising at the end of its chain a silanol function, or a polysiloxane block having a silanol end, or a diene polymer modified along its chain by silanol functions.

Preferentially suitable as a polysiloxane block having a silanol end are compounds of the following general formula:

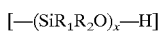

wherein $R_1$ and $R_2$ are the same or different, and represent an alkyl group containing 1 to 8 carbon atoms;

x is an integer ranging from 1 to 1500 and preferably from 1 to 50.

Understood by diene polymers suitable for use in the composition of the invention is any homopolymer obtained by polymerization of a conjugated diene monomer containing 4 to 12 carbon atoms, or any copolymer obtained by copolymerization of one or more conjugated dienes with each other or with one or more vinylaromatic compounds containing 8 to 20 carbon atoms. Suitable as conjugated dienes are, notably, butadiene-1,3, 2-methyl-1,3-butadiene, the 2,3-di($C_1$- to $C_5$-alkyl)-1,3-butadienes such as 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, etc.

Suitable as vinylaromatic compounds are, notably, styrene, ortho-, meta- and paramethylstyrene, the commercial mixture "vinyltoluene," para-tert.-butylstyrene, the methoxystyrenes, vinylmesitylene, divinylbenzene, vinylnaphthalene, etc.

The copolymers may contain between 99% and 20% by weight of diene units and from 1% to 80% by weight of vinylaromatic units.

The functionalized diene polymers possess, at the end of their chain, a silanol function or a polysiloxane block having a silanol terminus, or are modified along their chain by silanol functions which may have any microstructure which is a function of the polymerization conditions used. The polymers may be block polymers, statistical polymers, sequenced polymers, micro-sequenced polymers, etc., and be prepared in dispersion or solution. In case of an anionic polymerization, the microstructure of these polymers may be determined by the presence or absence of a modifying and/or randomizing agent and by the quantities of modifying and/or randomizing agent used.

Suitable, by preference, are the polybutadienes and, in particular, those having a 1,2-unit content of between 4% and 80%, polyisoprenes, butadiene-styrene copolymers, and particularly those having a styrene content of between 4 and 50% by weight and more particularly between 20% and 40% by weight, a 1,2-bond content of the butadiene part of between 4% and 65%, a trans-1,4-bond content of between 30% and 80%, butadiene-isoprene copolymers and notably those having an isoprene content of between 5 and 90% by weight and a glass transition temperature ($T_g$) of –40° C. to –80° C., isoprene-styrene copolymers and notably those having a styrene content of between 5 and 50% by weight and a $T_g$ between –25° C. and –50° C. Suitable in the case of butadiene-styrene-isoprene copolymers are those having a styrene content of between 5 and 50% by weight and more particularly between 10% and 40% by weight, an isoprene content of between 15% and 60% by weight and more particularly between 20% and 50% by weight, a butadiene content of between 5 and 50% and more particularly between 20% and 40% by weight, a 1,2-unit content of the butadiene part of between 4% and 85%, a trans-1,4-unit content of the butadiene part of between 6% and 80%, a 1,2- plus 3,4-unit content of the isoprene part of between 5% and 70%, and a trans-1,4-unit content of the isoprene part of between 10% and 50%, and more generally, any butadiene-styrene-isoprene copolymer having a $T_g$ between –20° C. and –70° C.

As for polymerization initiators, any known anionic or non-anionic, mono- or polyfunctional initiator may be used. However, an initiator containing an alkali metal such as lithium or an alkaline earth metal such as barium is preferentially used. Suitable as organolithium initiators are, notably, those which have one or more carbon-lithium bonds. Representative compounds are aliphatic organolithium compounds such as ethyl lithium, n-butyl lithium (n-BuLi), isobutyl lithium, dilithium polymethylenes such as 1,4-dilithiobutane, etc. Lithium amides are also preferred initiators, because they lead to polymers having a polar group at the chain end which does not carry the silanol function or the polysiloxane block having a silanol terminus. Lithium amide is obtained from a secondary acyclic or cylic amine, with pyrrolidine and hexamethyleneimine being highly preferred in the latter case; said amide may be rendered soluble in a hydrocarbon solvent by the joint use of a solvating agent, e.g., an ether, as described in Patent FR 2,250,774. Representative barium-containing compounds are those described, e.g., in Patent Applications FR-A 2,302, 31 1 and FR-A 2,273,822, and in the certificates of addition FR-A 2,338,953 and FR-A 2,340,958, whose content is incorporated herein.

As it is known per se, the polymerization is preferably carried out in the presence of an inert solvent, which may be, e.g., an aliphatic or alicyclic hydrocarbon such as pentane, hexane, heptane, isooctane, cyclohexane, or an aromatic hydrocarbon such as benzene, toluene or xylene.

The polymerization may be carried out in a continuous or discontinuous operation. The polymerization is generally conducted at a temperature between 20° C. and 120° C., and preferably between about 30° C. to 90° C. To be sure, it is also possible to add at the end of polymerization a transmetallation agent in order to modify the reactivity of the living chain terminus.

The functionalized diene polymers which have, at the end of the chain, a silanol function or a polysiloxane block comprising a silanol end and used in the present invention may be obtained by various procedures by analogy. A first method, described in *Journal of Polymer Science*, Part A, Vol. 3, pp. 93–103 (1965), consists in reacting the living diene polymer with an organo-silane functionalizing agent, preferably at the exit from the polymerization reactor and at the same or different temperature, preferably close to the polymerization temperature, to form a diene polymer having a halogenosilane function at the end of its chain, and subjecting it—as described in the manual "Chemistry and Technology of Silicones," Academic Press, New York, N.Y. (1968), p. 95—to the action of a proton donor in order to obtain the diene polymer silanol-functionalized at the end of its chain. The sequence of these 2 reactions has already been described by Greber and Balciunas in *Makromol. Chem.* 69, pp. 193–205 (1963). As examples of organosilane functionalizing agents capable of reacting with the living diene polymer, mention may be made of linear dihalogenosilanes having the formula:

wherein $R_1$ and $R_2$, which may be the same or different, represent an alkyl group containing 1 to 8 carbon atoms, X represents a halogen atom, and preferably chlorine or bromine.

As preferred dihalogenosilanes, mention may be made of dichloro-dimethylsilane, dichlorodiethylsilane, dichlorodiphenylsilane, dichlorophenylmethylsilane, and dichlorovinylmethylsilane.

A second method consists in reacting the living polymer with a cyclic polysiloxane functionalizing agent, to obtain a polymer having an SiO⁻ end, the reaction being carried out in a medium which does not permit the polymerization of said cyclopoly-siloxane. As examples of cyclic polysiloxanes, mention may be made of those having the formula:

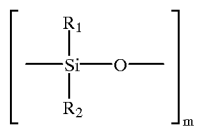

wherein
$R_1$ and $R_2$, which may be the same or different, represent an alkyl group containing 1 to 8 carbon atoms,
m represents an integer from 3 to 8,
and as preferred cyclic polysiloxanes, mention may be made of hexamethylcyclotrisiloxane, trimethyltriethylcyclotrisiloxane, octamethylcyclotetrasiloxane, decamethylcyclopentasiloxane, as well as their mixtures. The polymer having an SiO end is then reacted with a proton donor compound to form a diene polymer silanol-functionalized at its chain end.

A third method consists in preparing block copolymers comprising a polysiloxane block having a silanol end by sequenced polymerization. These block copolymers are obtained by the preparation of a first block of a living diene polymer as described, e.g., in U.S. Pat. Nos. 3,483,270, 3,051,684, and J. Appl. Poly. Sci., Vol. 8, pp. 2707–2716 (1964), which block is then reacted in a polar medium with a cyclic poly-siloxane which polymerizes anionically, forming a second block, in order to finally obtain a sequenced block copolymer comprising a polysiloxane block having a (SiO⁻) end which is then reacted with a proton donor, to form a block diene copolymer comprising a polysiloxane block having a silanol function at the end of its chain.

A fourth method consists in preparing block copolymers comprising a polysiloxane block having a silanol end by the graft of 2 polymers, e.g., by grafting a dilithiated or disodiated polysiloxane to a diene polymer having an (SiX) end, X representing a halogen atom; the grafted product is then reacted with a proton donor, to obtain the block copolymer comprising a polysiloxane block having a silanol end, as described, e.g., by Greber and Balciunas in *Makromol. Chem.* 79, pp. 149–160 (1964), or as cited by Plumb and Atherton in the manual "Block Copolymers," *Applied Science,* England (1973), p. 339.

The diene polymers modified along their chain by silanol functions may also be obtained by different procedures, including, e.g., the first and third methods presented above, by carrying out a prior metallation step of the polymer chain.

To be sure, one or more antioxidants may be added to the reaction mixture before recovering the functionalized polymer by conventional techniques, i.e. either by coagulation or by evaporation in vacuo, followed, if necessary, by drying, and even by steam distillation of the solvent, which will surprise a person skilled in the art, who would expect a macrostructural development as is usually the case with polymers functionalized by means of alkoxysilanes.

The functionalized diene polymers having at their end a silanol function or a polysiloxane block having a silane terminus, or modified along its chain by silanol functions, have a special ability to be used for forming rubber compositions containing carbon black having silica fixed to its surface as reinforcing filler.

The proportion of carbon black having silica fixed to its surface is at least 30 parts by weight of the polymer.

Said carbon black having silica fixed to its surface may be used in a blend with other reinforcing fillers such as carbon black or white fillers, notably silica. The relative percentage of these fillers may be adjusted on the basis of the property compromise of the compositions desired by persons skilled in the art.

The amount of silica present on the surface of the carbon black represents from 0.1 to 50% by weight, preferably from 0.3 to 30% by weight.

This carbon black having silica fixed to its surface may be obtained by different production methods. As an example, mention will be made of the production methods described in patent EP-A0,711,805, in Japanese Patent Application No. 63-63755, or of the production process of ECOBLACK CRX2000 marketed by CABOT Co. and described in Patent Application W096/37547.

Examples of silica suitable for use in the present invention are all precipitated or fumed silicas known to persons skilled in the art, and the highly dispersible silicas in particular.

Understood by the term "highly dispersible silica" is any silica capable of a high degree of deagglomeration and dispersion in a polymer mold, observable by electron microscopy or optical microscopy on thin layers. The dispersibility of the silica is also assessed by means of a test of the ability for de-agglomeration by ultrasound, followed by the measurement, by diffraction in a granulometer, of the particle size of silica, to determine the median diameter (D50) of the particles and the deagglomeration factor ($F_D$)) after deagglomeration, as described in Patent Application EP-A 0,520,860, whose content is incorporated herein or in the article published in the periodical *Rubber World,* June 1994, pages 20–24, titled "Dispersibility Measurements of Prec. Silicas."As nonlimitative examples of such silicas, mention may be made of the silica Perkasil KS 430 of AKZO Company, silicas Zeosil 1165 MP and 85 MP of Rhone-Poulenc, silica HI-Sil 2000 of PPG Co., silicas Zeopol 8741 or 8745 of Huber Co.

Suitable for use as carbon blacks are all carbon blacks that are commercially available or are conventionally used in tires, and particularly in tire treads. As non-limitative examples of such carbon blacks, mention may be made of carbon blacks N 234, N 339, N 326, N 375, etc.

In the composition according to the invention, the silanol-functionalized or modified diene polymer may be used alone or in a blend with any other elastomer conventionally used in tires such as natural rubber or a blend based on natural rubber and a synthetic elastomer, or another diene polymer possibly coupled and/or starred or even partially or completely functionalized with a function other than the silanol function. It is evident that the higher the proportion of conventional elastomer is in the composition according to the present invention, the less its properties will be improved. This is why a conventional elastomer may be present in an amount between I and 50 parts by weight per 100 parts of weight of silanol-functionalized or modified polymer.

In addition to one or more diene polymers and the carbon black having silica fixed to its surface, the compositions according to the present invention contain all or some of the other constituents and additives conventionally used in rubber blends such as plasticizers, pigments, antioxidants, antiozonant waxes, a vulcanization system based either on sulfur and/or peroxide and/or bismaleimides, vulcanization accelerators, expansion oils, or agents of linking with the elastomer and/or silica coating agents such as alkoxysilanes, polyols, amines, etc.

The present invention also relates to treads of tires and of tires of reduced rolling resistance.

DESCRIPTION OF PREFERRED EMBODIMENTS

The invention is illustrated, in a nonlimitative manner, by the following examples which are not intended to limit the scope of the invention.

In the examples, the properties of the compositions are evaluated as follows:

Mooney viscosity $ML_{1+4}$ (100° C.), measured according to ASTM Standard D-1646, and referred to as "Mooney" in the tables.

Elongation moduli at 300% (EM 300), 100% (EM 100) and 10% (EM 10): measurements carried out according to ISO 37.

Scott tear indices: Measured at 20° C. (force at rupture inMPa, Fr; elongation at rupture in %, Er).

Hysteresis losses, measured at 60° C. in %. The deformation for the measured losses is 35%.

Shore A hardness: Measurements performed according to DIN 53505.

Dynamic properties in shear:

Measurements carried out as a function of deformation at 10 to 23° C.,

The nonlinearity ΔG expressed in MPa is the difference in shear modulus between 0.15% and 50% of the peak to peak deformation.

The hysteresis is expressed by measurement of the peak G" and the peak tan δ at 23° C. and about 7% deformation, noted as $G"_{max23° C.}$ and $tan\ \delta_{max23° C.}$, respectively, according to ASTM D-2231-71 (reapproved in 1977).

The volume resistivity ($\rho_v$) is measured in ohm.cm according to ASTM D-257, its value being between $10^5$ and $10^{10}$ Ωcm. It will be expressed in the form of its log to the base 10, noted as Log resistivity.

EXAMPLE 1

The object of this example is to compare the properties of a composition based on a functionalized polymer having a silanol function at its chain end with those of two other compositions based on the same polymers, but one of which is not functionalized and the other is functionalized with a known prior-art functionalizing agent, these three compositions containing, as reinforcing filler, carbon black having silica fixed to its surface.

In all tests of this example, the diene polymer is a butadiene-styrene copolymer having 40% 1,2-butadiene bonds, 25% styrene, a glass transition temperature $T_g$ of −38° C., and a Mooney viscosity of 60.

The butadiene-styrene copolymers used in the three compositions are:

for test A, a copolymer having a terminal silanol and functionalized (SBR-A) for this purpose by means of a cyclic siloxane functionalizing agent consisting of hexamethylcyclotrisiloxane, D3;

for test B, a copolymer functionalized (SBR-B) by means of bis-diethylaminobenzophenone, DEAB, known to permit the obtainment of compositions having good hysteretic properties with carbon black;

for test C, a nonfunctionalized copolymer (SBR-C) stopped with methanol.

These SBR's were synthesized in a continuous process in toluene as polymerization solvent, and with butyl lithium as initiator. Thus, for all tests, the copolymer is prepared in a reactor of 32 liters useful capacity, with a turbine-type agitator, into which is continuously introduced toluene, butadiene, styrene and THF in a mass ratio of 100:10:4.3:0.3, and a solution of 500 micromoles of active n-BuLi per 100 grams of monomers. The flow rates of the different solutions are calculated so as to have a mean dwell time of 45 minutes under vigorous agitation. The temperature is maintained constant at 60° C. At the exit from the reactor, the conversion measured is 88%, and the SBR contains 25% (by mass) incorporated styrene and a content of 40% 1,2-bonds for the butadiene part.

To obtain SBR-A, there is added at the exit from the reactor, at the inlet of a static mixer, hexamethylcyclotrisiloxane (D3) in a D3/active n-BiLi ratio of 0.48. In the synthesis of SBR-C, D3 is replaced by methanol in a MeOH/active n-BuLi ratio of 1.5. In the synthesis of SBR-B, DEAB is added in the place of methanol in a DEAB/active n-BuLi ratio of 1.5.

The functionalization rates (Fn) are calculated by $^1$H-NMR, following the determination of the molecular mass by osmometry. In the three cases the molecular mass is 175,000 g.mol$^{-1}$. The number of milliequivalents per kg corresponding to the [—Si(CH$_3$)$_2$OH] unit for the functionalized polymer SBR-A is 4.6,or an 80% functionalization rate; the number of milliequivalents per kg corresponding to the [(C$_2$H$_5$)$_2$N-C$_6$H$_4$]$_2$COH unit for the functionalized polymer SBR-B is 4.7, i.e. an 82% functionalization rate.

In the three cases, there are added, after 5 minutes, 0.8 part of 2,2'-methylene-bis(4-methyl-6-tert.-butyl phenol) per 100 parts of elastomer (pce) and 0.2 pce of N-(1,3-dimethylbutyl)-N'-phenyl-p-phenylenediamine as antioxidants. The polymers are recovered in a conventional recovery operation by steam distilling the solvent and then drying the polymers on a cylindrical tool at 100° C. for 10 minutes.

By means of the three copolymers SBR-A, B and C, there are prepared, in a way known per se, three rubber compositions A1, B1 and C1 reinforced with carbon black having silica fixed to its surface, according to the following formulation, where all parts are expressed by weight:

| | |
|---|---|
| Elastomer: | 100 |
| Silica-treated carbon black (*): | 60 |
| Aromatic oil: | 25 |
| Linking agent (**): | 1.8 |
| Zinc oxide: | 2.5 |
| Stearic acid: | 1.5 |
| Antioxidant (a): | 1.9 |
| Paraffin (b): | 1.5 |
| Sulfur: | 1.1 |
| Sulfenamide (c): | 2 |
| Diphenylguanidine: | 0.42 |

(*) The carbon black having silica fixed to its surface is a carbon black marketed by CABOT Co. under the name NOIR ECOBLACK CRX2000 (% Si: 2.74 without HF treatment, 0.33% after HF treatment; specific surface area (N2): 138.9 m$^2$/g without HF treatment, 179.6 m$^2$/g after HF treatment).
(**) Polysulfurated organosilane marketed by Degussa Co. under the name SI69.
(a): Antioxidant: N-(1,3-dimethylbutyl)-N'-phenyl-p-phenylenediamine.
(b): Paraffin: Mixture of macro- and microcrystalline waxes.
(c): Sulfenamide: N-Cyclohexyl-2-benzothiazyl sulfenamide.

The three copolymers described above are used in a composition produced by the method described in Patent Application EP-A 0,501,227, incorporated in the present application, it being specified that a thermomechanical operation consisting of two stages is carried out, which last 5 minutes and 4 minutes respectively, at a mean paddle speed of 45 rpm until attaining an identical maximum drop temperature of 160° C., with the vulcanization system introduced at 30° C. on a cylindrical tool.

The vulcanization is carried out at 150° C. for 50 minutes. The properties of these 3 compositions are compared with one another in both the nonvulcanized and vulcanized state.

The results are shown in Table 1.

TABLE 1

| Composition | A1 | B1 | C1 |
|---|---|---|---|
| Stopper | D3 | DEAB | MeOH |
| Properties in the nonvulcanized state: | | | |
| $ML_{1+4}$ (100°) | 86 | 87.5 | 75.5 |
| Properties in the vulcanized state: | | | |
| Log resistivity | 9.38 | 8.14 | 7.98 |
| Shore | 55.9 | 58.8 | 59.7 |
| EM10 | 3.33 | 4.15 | 4.14 |
| EM100 | 1.50 | 1.56 | 1.56 |
| EM300 | 2.43 | 2.32 | 2.32 |
| EM300/EM100 | 1.62 | 1.49 | 1.49 |
| Scott  20° C. Fr | 19.4 | 23.7 | 21.2 |
|           20° C. Ar % | 420 | 585 | 530 |
| PH 60° C. | 19.7 | 24.4 | 26.1 |
| Dynamic properties as a function of deformation | | | |
| $\Delta G_{at\ 23°\ C.}$ | 0.95 | 2.29 | 2.60 |
| $G''_{max\ 23°}$ | 0.40 | 0.70 | 0.83 |
| $\tan \delta_{max\ 23°}$ | 0.23 | 0.29 | 0.33 |

It is noted with regard to the properties in the vulcanized state that composition A1 based on SBR-A (silanol-functionalized) shows hysteretic properties that are markedly better than those of composition C1 containing SBR-C (stopped with methanol) at low ($G''_{max23°}$; $\tan \delta_{max23°}$) and high (PH 60° C.) deformation, without any deterioration of the other properties as compared to the mixture with SBR-C.

The properties of composition A1 are also better than those obtained with composition B1 (SBR-B functionalized with DEAB).

EXAMPLE 2

The object of this example is to compare the rubber composition A1 according tou the invention (containing a silanol-functionalized polymer and carbon black having silica fixed to its surface) with a composition B2 containing SBR-B functionalized with DEAB and a filler consisting of carbon black, on the one hand, and a composition C2 containing SBR-C, a filler consisting of silica and a silane coating agent and coupling agent, on the other. These last two compositions, B2 and C2, are known to give good hysteretic properties with carbon black and silica.

The production method used is the same as that described in Example 1 for composition C1.

These compositions have the following formulations:

| Composition B2 | | Composition C2 | |
|---|---|---|---|
| Elastomer: | 100 | Elastomer: | 100 |
| Carbon black N234 | 60 | Silica (*): | 60 |
| Aromatic oil: | 25 | Aromatic oil: | 25 |
| | | Linking agent (**): | 4.8 |
| Zinc oxide: | 3 | Zinc oxide: | 2.5 |
| Stearic acid: | 2 | Stearic acid: | 1.5 |
| Antioxidant (a): | 1.9 | Antioxidant (a): | 1.9 |
| Paraffin (b): | 1.5 | Paraffin (b): | 1.5 |
| Sulfur: | 1.2 | Sulfur: | 1.1 |
| Sulfenamide (c): | 1.2 | Sulfenamide (c): | 2 |
| | | Diphenylguanidine: | 1.5 |

(*) Silica: ZEOSIL 1165, marketed by Rhône-Poulenc
(**) Polysulfurated organosilane, sold by Degussa Co. under the name SI69.

The results are shown in Table 2.

TABLE 2

| Composition | A1 | B2 | C2 |
|---|---|---|---|
| Stopper | D3 | DEAB | MeOH |
| Filler | silica-treated carbon black | Black | silica |
| Properties in the nonvulcanized state: | | | |
| $ML_{1+4}$ (100°) | 86 | 90.0 | 68.5 |
| Properties in the vulcanized state: | | | |
| Log resistivity | 9.38 | 5.3 | >10 |
| Shore | 55.9 | 60 | 58.4 |
| EM10 | 3.33 | 4.44 | 4.16 |
| EM100 | 1.50 | 1.51 | 1.37 |
| EM300 | 2.43 | 2.02 | 1.53 |
| EM300/EM100 | 1.62 | 1.34 | 1.12 |
| Scott  20° C. Fr | 19.4 | 22.7 | 23.0 |
|           20° C. Ar % | 420 | 650 | 705 |
| PH 60° C. | 19.7 | 30 | 26.1 |
| Dynamic properties as a function of deformation | | | |
| $\Delta G_{at\ 23°\ C.}$ | 0.95 | 4.84 | 1.88 |
| $G''_{max\ 23°}$ | 0.40 | 1.25 | 0.58 |
| $\tan \delta_{max\ 23°}$ | 0.23 | 0.36 | 0.25 |

It is noted that composition A1 (with silanol-functionalized SBR-A) comprising the carbon black ECO-BLACK CRX2000 shows a very strong decrease of hysteresis (at low and high deformation) of the order of 30% relative to that obtained for composition B2 based on carbon black, without any deterioration of the other properties.

Moreover, it is noted that composition A1 has hysteresis characteristics that are improved even in comparison to the silica-based composition C2, with a highly reduced conductivity level.

EXAMPLE 3

Compared in this example are three compositions A3, C3 and B3, based respectively on SBR-A (functionalized with D3), SBR-C (stopped with MeOH), and SBR-B (functionalized with DEAB) containing no linking agent but carbon black having silica fixed to its surface as reinforcing filler.

Compositions A3, C3 and B3 are prepared by the method presented in Example 1, and have the following formulation:

| | |
|---|---|
| Elastomer: | 100 |
| Silica-treated carbon black (*): | 60 |
| Aromatic oil: | 25 |
| Linking agent: | 0 |
| Zinc oxide: | 2.5 |
| Stearic acid: | 1.5 |
| Antioxidant (a): | 1.9 |

-continued

| | |
|---|---|
| Paraffin (b): | 1.5 |
| Sulfur: | 1.1 |
| Sulfenamide (c): | 2 |
| Diphenylguanidine: | 0.42 |

(*) The carbon black having silica fixed to its surface is a carbon black marketed by CABOT Co. under the name NOIR ECOBLACK CRX2000 (% Si: 2.74 without HF treatment, 0.33% after HF treatment; specific surface area (N2): 138.9 m$^2$/g without HF treatment, 179.6 m$^2$/g after HF treatment).

The results are compiled in Table 3.

TABLE 3

| Composition | A3 | B3 | C3 |
|---|---|---|---|
| Stopper | D3 | DEAB | MeOH |
| Properties in the nonvulcanized state: | | | |
| ML$_{1+4}$ (100°) | 88.2 | 91.5 | 76.5 |
| Properties in the vulcanized state: | | | |
| Log resistivity | 8.52 | 7.09 | 6.79 |
| Shore | 53.3 | 57.3 | 58.1 |
| EM10 | 3.10 | 4.13 | 4.35 |
| EM100 | 1.23 | 1.32 | 1.30 |
| EM300 | 1.80 | 1.65 | 1.61 |
| EM300/EM100 | 1.46 | 1.25 | 1.24 |
| Scott  20° C. Fr | 21.5 | 21.9 | 20.8 |
| 20° C. Ar % | 575 | 670 | 685 |
| PH 60° C. | 22.9 | 28.8 | 33.4 |
| Dynamic properties as a function of deformation | | | |
| $\Delta G_{at\ 23°\ C.}$ | 1.10 | 3.03 | 3.83 |
| $G''_{max\ 23°}$ | 0.45 | 0.78 | 0.97 |
| tan $\delta_{max\ 23°}$ | 0.25 | 0.38 | 0.38 |

It is noted that even without the use of coating and linking agent, composition A3 using (silanol-functionalized) SBR-A has a hysteresis level at low ($G''_{max23°\ C.}$; tan $\delta_{max23°\ C.}$) and high (PH 60° C.) deformation that is very low in comparison to the other two compositions which also contain carbon black having silica fixed to its surface as reinforcing agent, without any deterioration of the other properties.

Moreover, a very slight deterioration is noted of the hysteresis characteristics of compositions B3 and C3 based on SBR-B and SBR-C, respectively, in comparison to compositions B2 and C2 of Example 2 which are based on the same polymers but containing a coating agent and linking agent, whereas, on the contrary, the hysteresis characteristics of composition A3 are almost as good as those of composition A1 containing a coating and linking agent.

It should also be stressed that the other properties of mechanical cohesion (EM300), force and elongation at rupture) of composition A3 are not reduced in comparison to composition A1, nor is there a decrease in the level of conductivity.

EXAMPLE 4

The object of this example is to compare compositions A1 and C1 of Example 1 based on silanol-functionalized SBR and methanol-stopped SBR, respectively, with a composition F1 of the same formulation but using a different SBR.

This SBR-F is synthesized by a continuous process as in Example 1, with cyclohexane as polymerization solvent and hexamethyleneimine lithium (HMINLi) as initiator. It is functionalized by means of hexamethyicyclotrisiloxane (D3), the method of preparation of composition F1 being identical to that used for compositions A1 and C1.

The results are listed in Table 4.

TABLE 4

| Composition | A1 | C1 | F1 |
|---|---|---|---|
| Catalyst | BuLi | BuLi | HMIMLi |
| Stopper | D3 | MeOH | D3 |
| Properties in the nonvulcanized state: | | | |
| ML$_{1+4}$ (100°) | 86 | 75.5 | 120 |
| Properties in the vulcanized state: | | | |
| Log resistivity | 9.38 | 7.98 | 10 |
| Shore | 55.9 | 59.7 | 58.1 |
| EM10 | 3.33 | 4.14 | 3.71 |
| EM100 | 1.50 | 1.56 | 1.72 |
| EM300 | 2.43 | 2.32 | 2.70 |
| EM300/EM100 | 1.62 | 1.49 | 1.57 |
| Scott  20° C. Fr | 19.4 | 21.2 | 19.6 |
| 20° C. Ar % | 420 | 530 | 415 |
| PH 60° C. | 19.7 | 26.1 | 18.0 |
| Dynamic properties as a function of deformation | | | |
| $\Delta G_{at\ 23°\ C.}$ | 0.95 | 2.60 | 0.93 |
| $G''_{max\ 23°}$ | 0.40 | 0.83 | 0.39 |
| tan $\delta_{max\ 23°}$ | 0.23 | 0.33 | 0.21 |

In view of the properties in the vulcanized state, it is noted that composition F1, using the silanol-functionalized SBR-A but with a catalyst different from that of composition A1, has hysteresis characteristics at low and high deformation that are greatly improved in comparison to those of composition C1 based on methanol-stopped SBR-C, and also good, if not better properties than those obtained with composition A1.

Thus, it seems clear that the improvement of the hysteresis characteristics without any deterioration of other properties, obtained by using a silanol-functionalized polymer in the presence of a reinforcing filler consisting of carbon black having silica fixed to its surface, is independent of the choice of catalyst.

EXAMPLE 5

The object of this example is to compare composition G5 according to the invention with two other compositions H5 and I5 based on commercial SBR's.

Compositions G5, H5 and I5 are synthesized by a discontinuous process and are based on the following SBRs, respectively:

SBR-G is synthesized in cyclohexane in a discontinuous operation and functionalized by means of D3 according to the method described below;

T0589, manufactured by JAPAN SYNTHETIC RUBBER Co., is a polymer specifically modified to react with silica, and has the following characteristics: T$_g$=−32° C., % 1,2= 41%, %sty=33%, ML$_{1+4}$(100°)=45;

NS 116 manufactured by NIPPON ZEON Co. is a polymer specifically modified to react with carbon black, and has the following characteristics: T$_g$=−25° C., % 1.2=60%, %sty=21%, ML$_{1+4}$(100°)=50.

SBR-G is synthesized in a discontinuous operation as follows:

Into a reactor of 10 liters capacity containing 4.6 liters of de-aerated cyclohexane is injected 211 g of styrene, 429 g of butadiene and 2000 ppm of THF. The impurities are neutralized with n-BuLi, then 0.0033 mole of n-BuLi as well as 0.001 mole of sodium tert.-butylate used as randomizing agent are added, and the polymerization is carried out at 55° C.

At 90% conversion, 0.0011 mole of hexamethylcyclotrisiloxane (D3) is injected into the reactor. The polymer solution is agitated for 15 minutes at 55° C. The polymer is anti-oxidized by the addition of 0.80 pce of 2,2-methylene-bis(4-methyl-6-tert.-butylmethylphenol) and 0.20 pce of N-(1,3-dimethylbutyl)-N'-phenyl-p-phenylenediamine, then recovered by steam distillation and dried on a cylindrical tool at 100° C.

The Mooney viscosity ($ML_{1+4}100°$) is 46, the percent by mass of incorporated styrene (%sty), determined by $^1$H-NMR, is 33%, and the proportion of vinyl chains of the butadiene part (% 1,2) is 41%.

NMR analysis gives a [—Si(CH$_2$)$_2$]-OH functionalization rate of 4 mEq./kg, which, taking into account the molecular mass of the copolymer as indicated by osmometry (175,000 g/mole), corresponds to a [SiOH] functionalization rate of about 70%.

The three compositions G5, H5 and I5 have the same formulation as that specified in Example 1 based on carbon black ECOBLACK CRX2000 with silica fixed to its surface, and the method of preparation of these compositions is also identical to that used for composition A1 of Example 1.

The results are listed in Table 5.

TABLE 5

| Composition | G5 | H5 | I5 |
|---|---|---|---|
| SBR | SBR-G | T0589 | NS116 |
| Properties in the nonvulcanized state: | | | |
| $ML_{1+4}$ (100°) | 109 | 56 | 48 |
| Properties in the vulcanized state: | | | |
| Log resistivity | 10 | 7.84 | 7.48 |
| Shore | 56.8 | 58.6 | 59.8 |
| EM10 | 3.58 | 4.39 | 4.47 |
| EM100 | 1.71 | 1.72 | 1.70 |
| EM300 | 2.98 | 2.60 | 2.49 |
| EM300/EM100 | 1.74 | 1.51 | 1.46 |
| Scott 20° C. Fr | 22.6 | 23.3 | 20.8 |
| 20° C. Ar % | 445 | 535 | 515 |
| PH 60° C. | 17.5 | 29.0 | 29.1 |
| Dynamic properties as a function of deformation | | | |
| Δ G$_{at\ 23°\ C.}$ | 1.03 | 2.47 | 2.60 |
| G"max 230 | 0.526 | 0.951 | 0.977 |
| tan δ$_{max\ 23°}$ | 0.266 | 0.341 | 0.364 |

In view of the properties in the vulcanized state, it is noted that only composition G5 based on a SBR-G in accordance with the invention makes it possible to obtain very low hysteresis characteristics and very high reinforcement properties.

It thus seems that the use of just any functionalized polymer adapted to carbon black does not make it possible to obtain an improvement of the hysteretic and physical properties when employed in a composition based on silica-treated carbon black (in this case ECOBLACK CRX2000), nor are the properties improved upon transposition of just any polymer specifically functionalized for silica to a composition comprising silica-treated carbon black as reinforcing filler.

I claim:

1. A vulcanizable rubber composition comprising at least one diene polymer and carbon black having silica fixed to its surface as reinforcing filler, characterized in that the diene polymer is a functionalized diene polymer carrying at its chain terminal a silanol function or a polysiloxane block having a silanol terminal, or a diene polymer modified along its chain by silanol functions.

2. A composition according to claim 1, characterized in that the polysiloxane block having a silanol terminal has the formula:

wherein

R$_1$ and R$_2$, which are the same or different, represent an alkyl group containing 1 to 8 carbon atoms, and x is an integer ranging from 1 to 1500.

3. A composition according to claim 2, characterized in that R$_1$ and R$_2$ represent an alkyl group containing 1 to 5 carbon atoms.

4. A composition according to claim 1, characterized in that the diene polymer is a butadiene-styrene copolymer or a butadiene-styrene-isoprene copolymer.

5. A composition according to claim 4, characterized in that it also contains polybutadiene and/or a butadiene-isoprene copolymer and/or natural rubber.

6. A composition according to claim 1, characterized in that the amount of silica present on the surface of the carbon black is from 0.1 to 50% by weight.

7. A composition according to claim 6, characterized in that the amount of silica present on the surface of the carbon black is from 0.3 to 30% by weight.

8. A composition according to claim 1, characterized in that the carbon black having silica fixed to its surface is used in a blend with other reinforcing fillers.

9. A tire comprising a vulcanized rubber composition containing at least one diene polymer and carbon black having silica fixed to its surface as reinforcing filler, characterized in that the diene polymer is a functionalized diene polymer having at its chain terminal a silanol function or a polysiloxane block having a silanol terminal, or a diene polymer modified along its chain by silanol functions.

10. A tire according to claim 9, characterized in that said composition enters into the make-up of the tire tread.

11. A tire tread consisting of a vulcanized rubber composition comprising at least one diene polymer and carbon black having silica fixed to its surface, characterized in that the diene polymer is a functionalized diene polymer carrying at the end of its chain a silanol function or a polysiloxane block having a silanol terminal, or a diene polymer modified along its chain by silanol functions.

12. A composition according to claim 3, wherein R$_1$ and R$_2$ represent a methyl group.

* * * * *